United States Patent
Sanjay et al.

(10) Patent No.: US 7,573,812 B2
(45) Date of Patent: Aug. 11, 2009

(54) PASSIVE VIRTUAL ROUTER REDUNDANCY PROTOTCOL

(75) Inventors: Khanna Sanjay, Cary, NC (US);
Venugopalan Ullanatt, Cary, NC (US);
Tobias Karlsson, Raleigh, NC (US);
David Sinicrope, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 410 days.

(21) Appl. No.: 11/614,354

(22) Filed: Dec. 21, 2006

(65) Prior Publication Data
US 2008/0151882 A1    Jun. 26, 2008

(51) Int. Cl.
H04L 12/56    (2006.01)
(52) U.S. Cl. ..................................... 370/219
(58) Field of Classification Search .............. 370/219, 370/220
See application file for complete search history.

(56) References Cited
U.S. PATENT DOCUMENTS
2005/0117598 A1*  6/2005  Iijima et al. ................ 370/412
2007/0008880 A1*  1/2007  Buchko et al. .............. 370/218

OTHER PUBLICATIONS

Kuo et al., 'An Evaluation of the Virtual Router Redundancy Protocol Extension with Load Balancing', Dec. 2005, Dependable Computing, 2005, pp. 1-8.*
Hinden, R. and Nokia; "Virtual Router Redundancy Protocol (VRRP)"; Network Working Group; Request for Comments: 3768; Obsoletes: 2338; Category: Standards Track; Apr. 2004 The Internet Society (2004).

* cited by examiner

Primary Examiner—Melvin Marcelo
(74) Attorney, Agent, or Firm—Roger S. Burleigh

(57) ABSTRACT

The present invention relates to a pair of routers which implement an active VRRP group and one or more passive VRRP groups wherein the active VRRP group executes the VRRP election protocol and the passive VRRP group(s) do not execute the VRRP election protocol but instead the passive VRRP group(s) mimic the active VRRP group such that when the active VRRP group has a state change then all of it's dependent passive VRRP group(s) will also have the same state change such as becoming a master or a backup.

15 Claims, 4 Drawing Sheets

PASSIVE VIRTUAL ROUTER REDUNDANCY PROTOTCOL

TECHNICAL FIELD

The present invention relates to an Ethernet router and a method which enables the implementation of the Virtual Router Redundancy Protocol (VRRP) for more than 255 VRRP groups per Ethernet VLAN (today only 255 VRRP groups or less per Ethernet VLAN can be implemented using the VRRP standard).

BACKGROUND

The following abbreviations are herewith defined, at least some of which are referred to within the ensuing description of the prior art and the present invention.
ARP Address Resolution Protocol
CPU Central Processing Unit
MAC Media Access Control
IP Internet Protocol
ISER Integrated Site Edge Router
RFC Request For Comments
VLAN Virtual Local Area Network
VRI Virtual Router Instance
VRID Virtual Router Identifier
VRRP Virtual Router Redundancy Protocol Referring to FIG. 1 (PRIOR ART), there is illustrated an exemplary Ethernet network 100 which is used to help describe VRRP and one problem associated with implementing VRRP that is addressed by the present invention. In this example, the Ethernet network 100 includes two physical routers, R1 and R2. Assume, R1 has IP address 192.32.15.1/MAC of 00:00:A2:0B:00:01 and R2 has IP address 192.32.15.2/MAC of 00:00:A2:BE:D0:03. R1 backs-up R2 and vice-versa. Therefore, R1 and R2 each have two VRRP virtual routers in this example: virtual router V1 with IP address IP(V1)=192.32.15.1, VRID of 37, and virtual router V2 with IP address IP(V2)=192.32.15.2, VRID of 73. Plus, virtual router V1 has a VRRP MAC address of MAC(V1)=00:00:5E:00:01:25 (VRID 37, Hex 25), and virtual router V2 has a VRRP MAC address of MAC(V2)=00:00:5E:00:01:49 (VRID 73, Hex 49).

As shown, R1 has V1 which is currently the "master" and is a part of a virtual router instance VRI-1. And, R2 has V1 which is currently the "backup" and is also a part-of the virtual router instance VRI-1. Both of the V1's form what is known as VRRP Group V1=37 (recall the VRID of 37). Likewise, R1 has V2 which is currently the "backup" and is a part of a virtual router instance VRI-2. And, R2 has V2 which is currently the "master" and is also a part of the virtual router instance VRI-2. Both of the V2's form what is known as VRRP Group V2=73 (recall the VRID of 73). In the Ethernet field, there can be at most 255 VRRP groups per Ethernet VLAN because all VRRP routers (including V1 and V2) have a common MAC address of the format 00:00:5E:00:01:XX where the last octet (XX) is the VRRP group identifier (i.e., the highest hex FF in the last octet corresponds to the highest 255th VRRP group). The limited number of 255 VRRP VRIs (or VRRP groups) that can be used in the Ethernet network 100 is one of the problems that is addressed by the present invention (note: in all of the examples shown and discussed herein it should be appreciated that each VRI has its own VRRP group).

In this example, R1 is the master for V1 because it is the IP address owner (recall both R1 and V1 have the same IP=192.32.15.1). Thus, R1 periodically sends VRRP advertisements with the source MAC address set to its VRRP address (MAC(V1)=00:00:5E:00:01:25) and the destination set to an Ethernet multicast MAC address 01:00:5E:00:00:12 (this address is established by the standards). The backup for virtual router V1, in this case R2, registers to monitor the Ethernet multicast MAC 01:00:5E:00:00:12 and listens passively to the transmitted VRRP advertisements. If the link 102 to R1 fails (or R1 itself fails), then R2 will not receive the VRRP advertisements and will take over as the "master" for VRRP group V1 and act as the active router for V1 (i.e., V1's VRRP state machine transitions from "backup" to "master" in R2)(see the link failure scenario shown in FIG. 2).

Host H1 is configured to use a default router IP address which in this example is IP(V1). As such, when H1 initializes it sends out an ARP request to its configured default router IP(VL) 192.32.15.1. The physical router R1 which is the master for V1 receives this ARP requests and responds with the MAC address of V1, the VRRP MAC(V1)=00:00:5E:00:01:25 (this assumes the link 102 or R1 have not failed). Host H1 updates its ARP cache with this MAC(V1)=00:00:5E:00:01:25. Now, later when host H1 wants to talk to host H13 (for example) on another subnet (not shown), it sends a packet with the source MAC address set to MAC(H1), the destination MAC address set to MAC(V1), the source IP address of IP(H1), and the destination IP address of IP(H13). Router R1, which is currently the master for V1, receives this packet and forwards it to another interface to be forwarded through a common cloud 102 to H13 (this scenario is shown in FIG. 1—no fault). If the link 102 to R1 fails (or R1 itself fails), host H1 need not make any changes; the packet is simply forwarded to H13 via R2 in a manner that is completely transparent to H1 (see FIG. 2—the link fault scenario when R2 becomes the "master" for VRRP group V1 after it does not receive VRRP advertisements associated with V1 from R1 and R1's V1 and V2 both transition to "initialization")(note: if R1 itself failed then R1's V1 and V2 would not transition to "initialization" instead they would not work). Once, the failure of link 102 to R1 is resolved then R1 will become the "master" and R2 reverts to being the "backup" for V1 (these state transitions also take place if a failure to R1 itself is resolved). Again, H1 will not be aware of any of these changes. Similarly, the same can be said about host H2 and its default router IP(V2). If a link to Router R2 (the master for the VRRP group V2) fails (or R2 itself fails), then R1 takes over the mastership of the VRRP group V2. Host H2 does not need to make any changes when this happens.

Now when the link 102 to R1 fails (or R1 itself fails), then during the time it takes R2 to detect this failure by not receiving the VRRP advertisements and during the time it takes R2 to become the master for V1 all of the packets which where sent by host H1 are going to be lost. So, to keep the packet loss at a minimum this down time should be kept as small as possible. For instance, VRRP as discussed in the RFC 3768 requires this detection time to be completed in seconds (see RFC 3768 "Virtual Router Redundancy Protocol (VRRP)" dated April 2004—the contents of which are incorporated by reference herein). This multi-second time delay is not necessarily desirable. Thus, a relatively new router which is known in the field as an ISER has been developed to implement a variant of RFC 3768 which can switch traffic received from one or more hosts to a backup router in less than 200 milliseconds.

Unfortunately, Ethernet networks with routers R1 and R2 that implement either the multi-second VPPR or the sub-second VPPR still have a problem because of the limited number of 255 possible VRRP groups per Ethernet VLAN (recall that 255 is set due to the last octet (XX) in the common VRRP MAC address 00:00:5E:00:01:XX). This is a problem since routers R1 and R2 can often support many VRI's (e.g., more than 500 VRIs) but only 255 of those VRIs can be VRRP VRIs (which support VRRP). Thus, it would be desirable if all of these VRIs could implement VRRP where in the event of a failure then all of the VRIs can re-direct traffic away from the "master" router towards the "backup" router. This need and other needs are satisfied by the passive VRRP solution of the present invention.

SUMMARY

The present invention relates to a pair of routers which implement an active VRRP group and one or more passive VRRP groups wherein the active VRRP group executes the VRRP election protocol and the passive VRRP group(s) do not execute the VRRP election protocol but instead the passive VRRP group(s) mimic the active VRRP group such that when the active VRRP group has a state change then all of it's dependent passive VRRP group(s) will also have the same state change such as becoming a master or a backup (note: the present invention introduces the terms "active" VRRP group and "passive" VRRP group).

BRIEF DESCRIPTION OF THE DRAWINGS

A more complete understanding of the present invention may be obtained by reference to the following detailed description when taken in conjunction with the accompanying drawings wherein.

DETAILED DESCRIPTION

An enhanced router R1' is described herein which can implement VRRP on a large number of VRIs (>255 VRRP VRIs per Ethernet VLAN) by: (1) configuring an active VRI ("master" virtual router) which is part of an active VRRP group that includes a corresponding active VRI ("backup" virtual router) which is associated with a "backup" router R2'; and (2) configuring one or more passive VRI(s) ("master" virtual router(s)) which is/are part of a passive VRRP group that includes one or more corresponding passive VRI(s) ("backup" virtual router(s)) which is/are associated with router R2'. In this configuration, the enhanced R1' and in particular the passive VRI(s) ("master" virtual router(s)) do not multicast VRRP advertisements for their corresponding passive VRI(s) ("backup" virtual router(s)) which is/are associated with the "backup" router R2'. Instead, the passive VRI(s) ("master" virtual router(s)) mimic a state of the active VRI ("master" virtual router) which does multicast VRRP advertisements for the corresponding active VRI associated with the "backup" router R2'. Thus, if a link 102 to router R1' fails (or the R1' itself fails) then R1's active VRI (virtual router) is going to have it's VRRP state machine change from "master" to "backup" and R1's passive VRI(s) (virtual router(s)) which do not have a VRRP state machine are going to mimic this and change their state from "master" to "backup". Likewise, R2's corresponding active VRI (virtual router) is going to have it's VRRP state machine change from "backup" to "master" and R2's corresponding passive VRI(s) (virtual router(s)) which do not have a VRRP state machine are going to mimic this and change their state from "backup" to "master". An example is discussed next to further help explain the configuration, features and benefits associated with the present invention.

Figure 3:
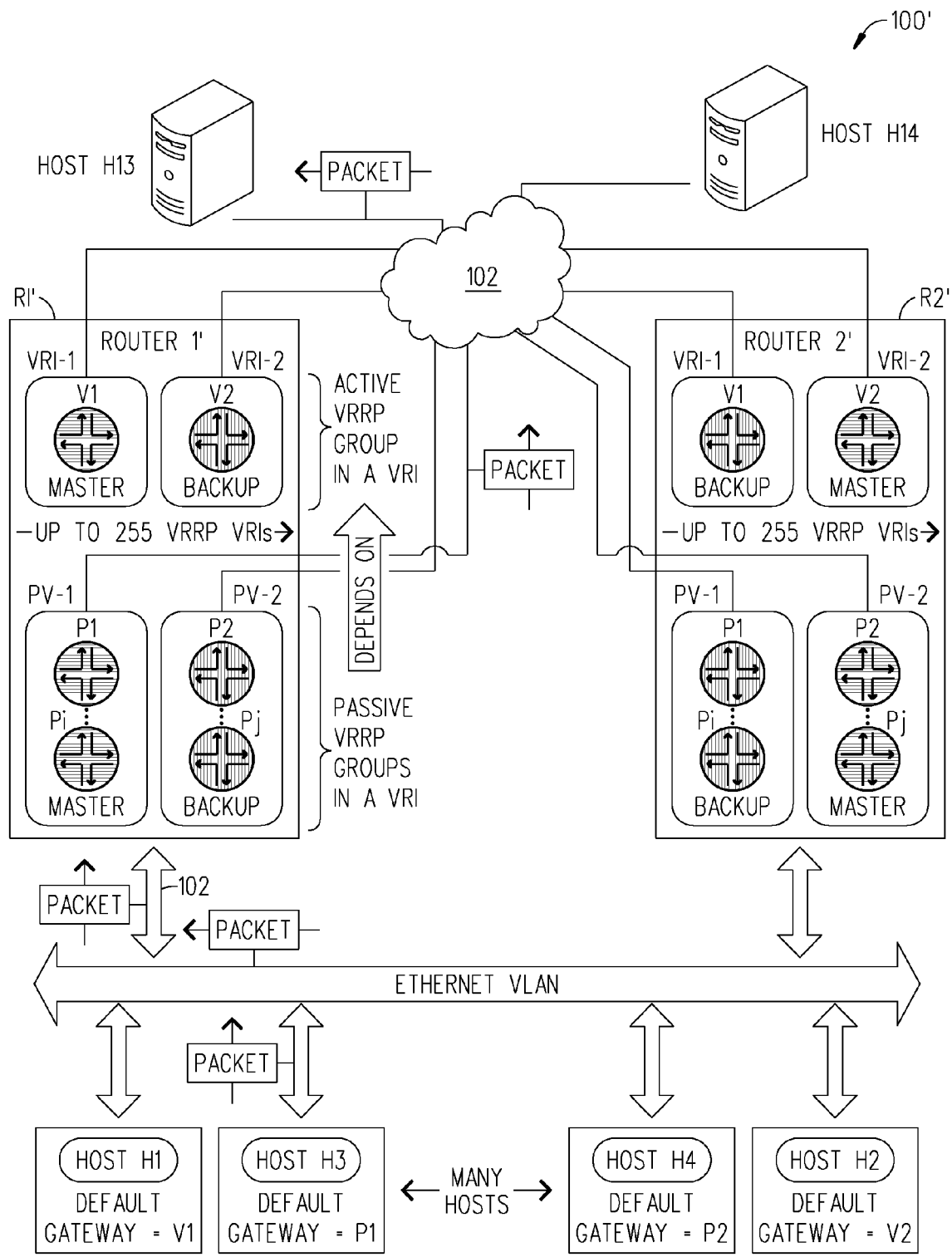
FIGS. 3-4 illustrate an exemplary Ethernet network which is used to help explain how routers R1' and R2' overcome the prior art's VRRP problem by implementing the passive VRRP solution in accordance with the present invention.

Referring to FIG. 3, there is illustrated an exemplary Ethernet network 100' in which the routers R1' and R2' have been enhanced to in effect be able to implement more than 255 VRRP groups per Ethernet VLAN in accordance with the present invention. In this example, the Ethernet network 100' includes two physical routers, R1' and R2'. Assume, R1' has IP address 192.32.15.1/MAC of 00:00:A2:0B:00:01 and R2' has IP address 192.32.15.2/MAC of 00:00:A2:BE:D0:03. R1' backs-up R2' and vice-versa. Therefore, R1' and R2' each have two VRRP virtual routers in this example: virtual router V1 with IP address IP(V1)=192.32.15.1, VRID of 37, and virtual router V2 with IP address IP(V2)=192.32.15.2, VRID of 73. Plus, virtual router V1 has a VRRP MAC address of MAC(V1)=00:00:5E:00:01:25 (VRID 37, Hex 25), and virtual router V2 has a VRRP MAC address of MAC(V2)=00:00:5E:00:01:49 (VRID 73, Hex 49). Moreover, discussed below there is a virtual router P1 which has an IP(P1)=192.132.15.1 and a MAC(P1)=00:00:5E:00:01:25, and a P2 which has an IP(P2)=192.132.15.2 and a MAC(P2)=00:00:5E:00:01:49.

Figure 1:
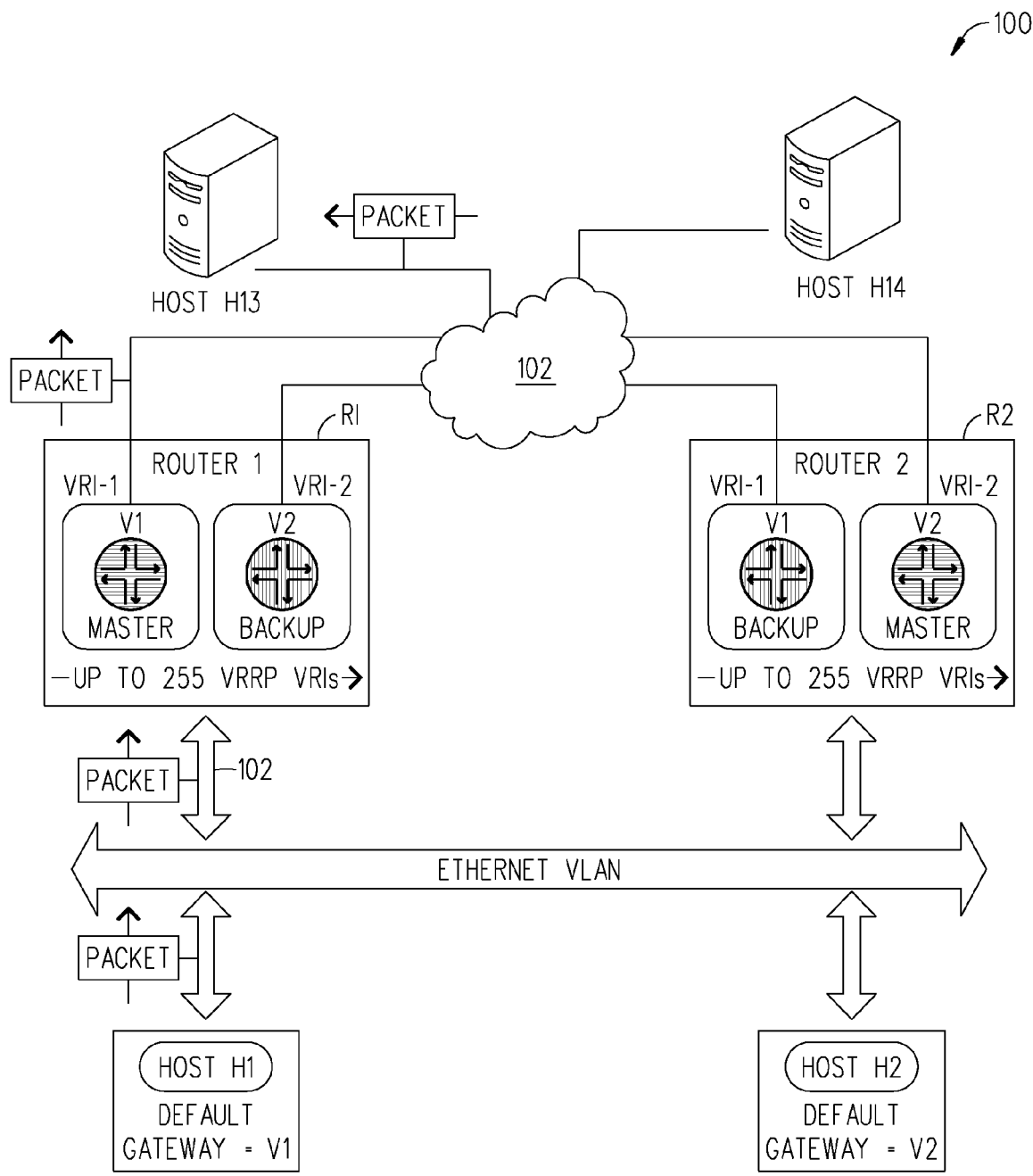
FIGS. 1-2 (PRIOR ART) illustrate an exemplary Ethernet network which is used to help describe VRRP and one of the problems associated with implementing VRRP which is addressed by the passive VRRP solution in accordance with the present invention.
Figure 2:
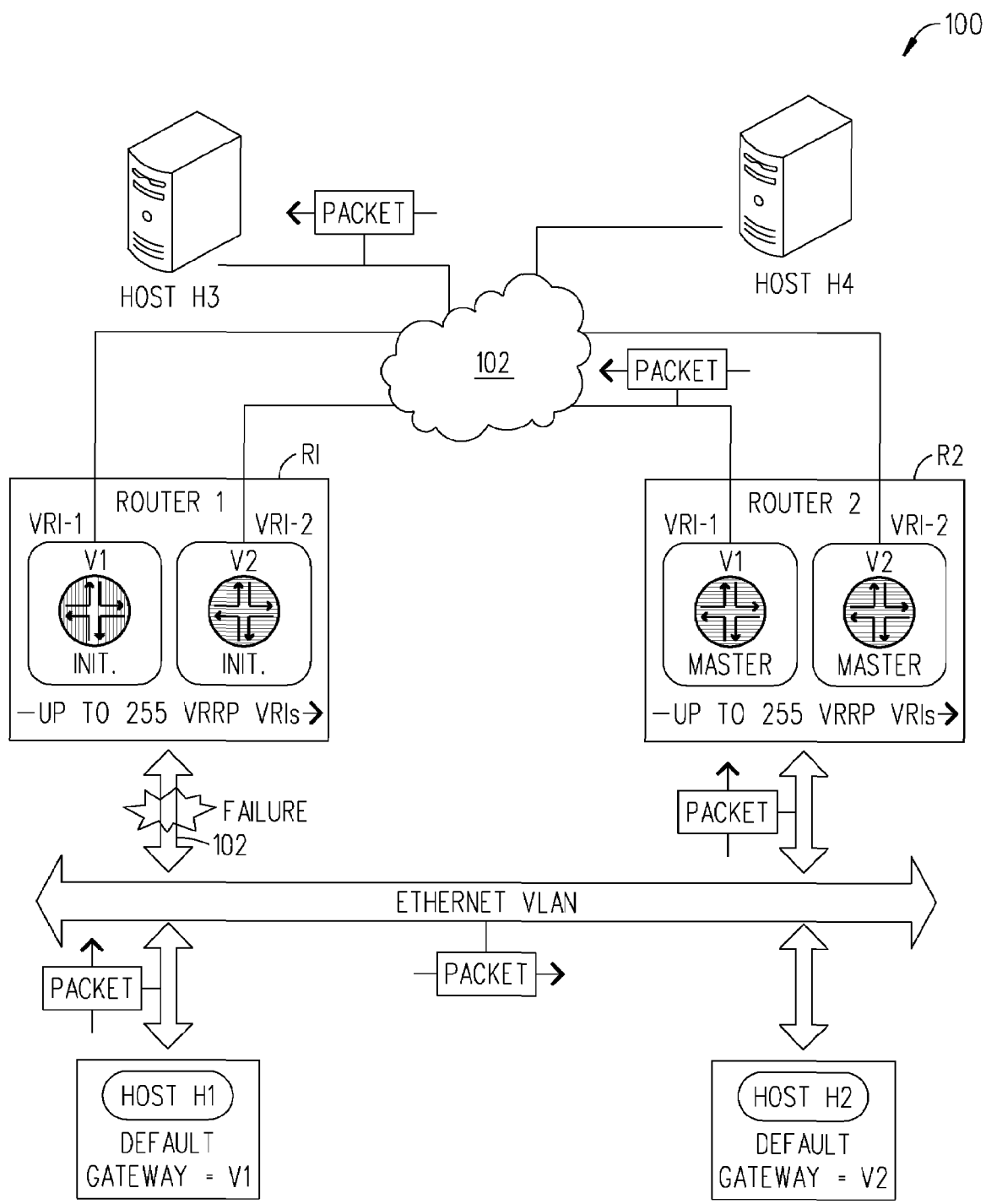

As shown, R1' has V1 which is currently the "master" and is a part of a virtual router instance VRI-1. And, R2' has V1 which is currently the "backup" and is also a part of the virtual router instance VRI-1. Both of the V1's form what is called hereinafter the active VRRP Group V1=37 (recall the VRID of 37). Likewise, R1' has V2 which is currently the "backup" and is a part of a virtual router instance VRI-2. And, R2' has V2 which is currently the "master" and is also a part of the virtual router instance VRI-2. Both of the V2's form what is called hereinafter the active VRRP Group V2=73 (recall the VRID of 73). The active VRRP routers V1 and V2 are the same as the VRRP routers V1 and V2 discussed in the prior art example (see FIGS. 1-2). However, R1' and R2' in contrast to the prior art example each may have many passive VRRP groups (compare to FIGS. 1-2). In this example, PV1 is a virtual router instance which has passive-VRRP groups P1 . . . Pi and these passive groups are dependent upon the active-VRRP instance V1. Similarly, PV2 is a virtual router instance which has passive-VRRP groups P2 . . . Pj and these passive groups are dependent upon the active-VRRP instance V2. The significance of the term "passive" is that the PV1 and PV2 themselves do not take part in the VRRP signaling (VRRP advertisements), but instead they respectively follow the state of V1 and V2 which are associated with active VRRP groups V1 and V2. Thus, if R1' is the "master" for V1, then R1' will also be the "master" for P1 . . . Pi. Since, P1 . . . Pi are dependent upon V1, the virtual MAC associated with P1 . . . Pi is going to be the same as V1, MAC(V1)=MAC(PV1)=00:00:5E:00:01:25. Similarly, if R2' is the "master" for V2, then R2' will also be the "master" for P2 . . . Pj. Since, P2 . . . Pj is dependent upon V2, the virtual MAC associated with P2 . . . Pj is going to be the same as V2, MAC(V2)=MAC(PV2)=00:00:5E:00:01:49.

Figure 4:
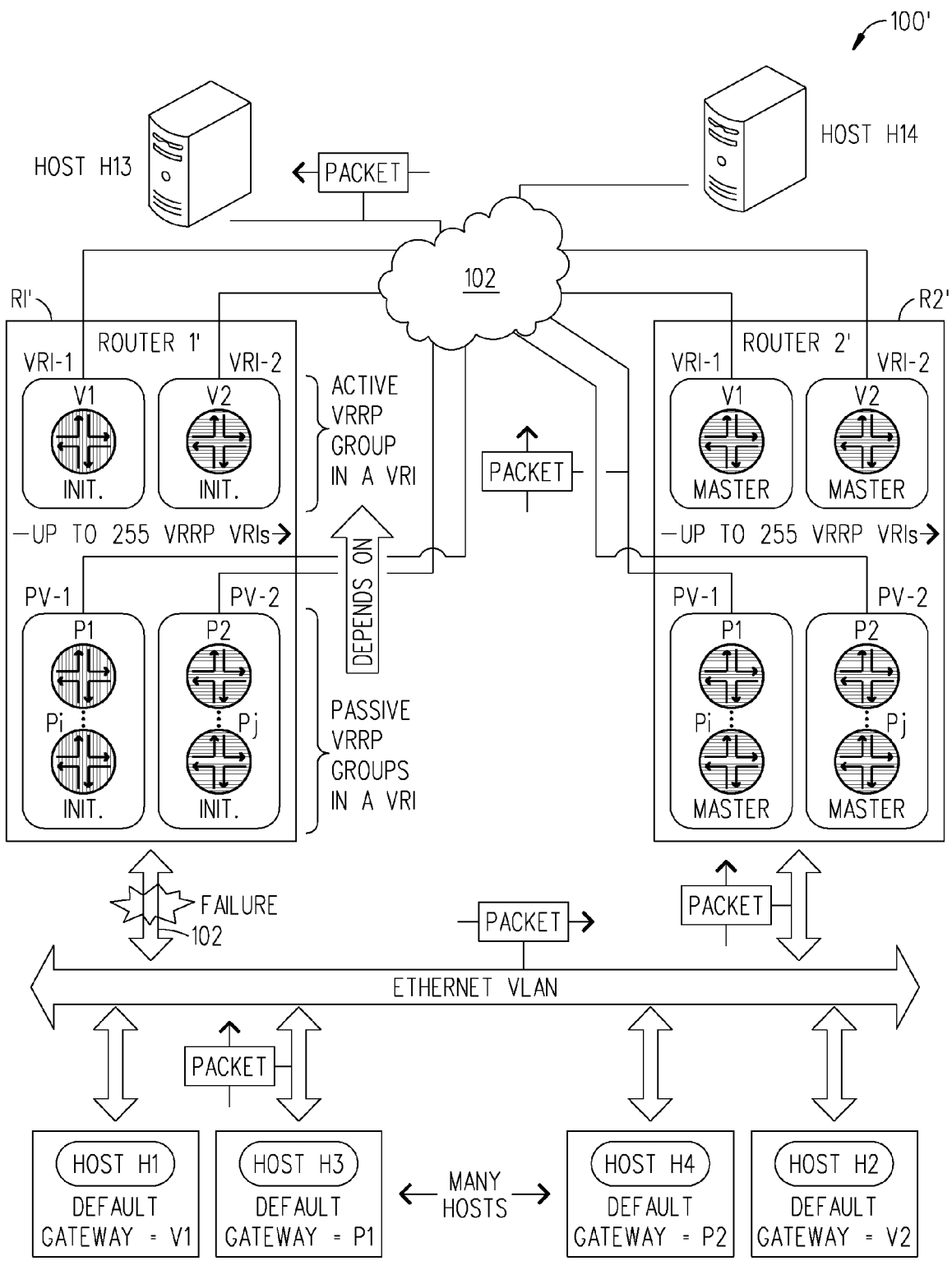

In this example, R1' is the master for V1 because it is the IP address owner (recall both R1' and V1 have the same IP=192.32.15.1 but notice that the P1 has a different IP address IP(P1)=192.132.15.1). Thus, R1' periodically multicasts VRRP advertisements with the source MAC address set to its VRRP address (MAC(V1)=00:00:5E:00:01:25) and the destination set to an Ethernet multicast MAC address 01:00:

5E:00:00:12 (this address is established by the standards). The backup for virtual router V1, in this case R2', registers to monitor the Ethernet multicast MAC address 01:00:5E:00:00:12 and listens passively to the transmitted VRRP advertisements. If the link 102 to R1' fails (or R1' itself fails), then R2' will not receive the VRRP advertisements and will take over as the "master" for the active VRRP group V1 and act as the active router for V1 (i.e., V1's VRRP state machine transitions from "backup" to "master" in R2' ). If this occurs, then R2's passive VRRP groups P1 . . . Pi will also transition from "backup" to "master" (note: virtual routers P1 . . . Pi do not have a VRRP state machine)(see the link failure scenario shown in FIG. 4 also see where R1's V1, V2, P1 . . . Pi and P2 . . . Pj all transition to "initialization")(note: if R1 itself failed then R1's V1, V2, P1 . . . Pi and P2 . . . Pj would not transition to "initialization" instead they would not work)). This is an important feature of the passive VRRP solution which enables a large number of VRI's (more than 255 per Ethernet VLAN) to effectively run the VRRP protocol. Plus, it is also important to note that the signaling (multicasting VRRP advertisements) is reduced and likewise the CPU's load is reduced when the passive VRRP solution is implemented since only the active VRRP groups multicast the VRRP advertisements.

To continue this example, assume host H3 is configured to use a default router IP address which in this example is IP(P1)=192.132.15.1 (note: IP(P1) is not the same as IP(V1)=192.32.15.1), As such, when H3 initializes it sends out an ARP request to its configured default router IP(P1)=192.132.15.1. The physical router R1' which is the master for P1 receives this ARP request and responds with the MAC address of P1, MAC(P1)=MAC(PV1)=MAC(V1)=00:00:5E:00:01:25 (this assumes link 102 or R1' have not failed). Host H3 updates its ARP cache with this MAC(P1)=00:00:5E:00:01:25. Now, later when host H3 wants to talk to host H13 (for example) on another subnet (not shown), it sends a packet with the source MAC address set to MAC(H3), the destination MAC address set to MAC(P1), the source IP address of IP(H3), and the destination IP address of IP(H13). Router R1', which is currently the master for P1, receives this packet and forwards it to another interface to be forwarded through a common cloud 102 to H13 (this scenario is shown in FIG. 3—no fault). If link 102 to R1' fails (or R1' itself fails), host H3 need not make any changes; the packet is simply forwarded to H13 via R2' in a manner that is completely transparent to H3 (see FIG. 4—the link fault scenario when R2' becomes the "master" for both active VRRP group V1 and passive VRRP group PV1 after it does not receive VRRP advertisements (associated with V1) from R1' ). Once, the failure of link 102 to R1' is resolved then R1' will become the "master" and R2' reverts to being the "backup" for both the active VRRP group V1 and passive VRRP group PV1 (these state transitions also take place if a failure to R1' itself is resolved). Again, H3 is not aware of any of these changes. Similarly, the same can be said about host H4 and its default router IP(P2). If a link to Router R2' (master for both the active VRRP group V2 and the passive VRRP group PV2) fails (or R2' itself fails), then R1' takes over the mastership of both the active VRRP group V2 and the passive VRRP group PV2. Host H4 does not need to make any changes when this happens.

From the foregoing, it should be appreciated by those skilled in the art that two routers R1' and R2' where one is master and the other one is backup are used in the passive VRRP solution of the present invention. In these two routers R1' and R2', an active VRRP group (possibly a sub-second VRRP group), on a VLAN sub-interface, is configured, and assigned both an active VRRP group number and an IP address. In addition, in these two routers R1' and R2', a passive VRRP group, on a VLAN sub-interface, is configured, and assigned a passive VRRP group number and one or more IP address(es)(one IP address for each VRI). The sub-interface that is to be protected by the passive VRRP group is also configured and associated with a port on the active VRRP group. The passive VRRP solution of the present invention also has several attributes which are as follows:

1. No VRRP signaling will be sent for the passive VRRP group because all of the VRRP protocol state transitions for the passive group are done based on the transitions of the corresponding active VRRP group.
2. The VRRP virtual MAC address for the passive group is the same as the VRRP MAC address of its corresponding active VRRP group. The use of the same VRRP virtual MAC for both the active VRRP group and the related passive VRRP group effectively overcomes the aforementioned 255 VRRP group per Ethernet VLAN limitation.
3. The VRRP virtual IP addresses associated with a passive VRRP group are supplied at configuration time.
4. Whenever a sub-interface with a passive VRRP configuration is deleted or an IP address of the passive sub-interface is removed, then so are the Virtual IP address and the Virtual MAC address.
5. The passive VRRP sessions form a dependency on their corresponding VRRP active session. Thus, the active VRRP session cannot be removed while any dependent passive VRRP sessions still exist.
6. The sub-second VRRP can be provided for a large number of VRIs and VLAN interfaces. Thus, the present invention overcomes the inherent limitation in the VRRP protocol that only upto 255 VRRP groups per Ethernet VLAN can be configured.
7. The CPU's load is reduced because there is less signaling when passive VRRP groups are utilized.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the spirit of the invention as set forth and defined by the following claims.

The invention claimed is:

1. A router comprising:
    an active Virtual Router (VR) which is part of an active Virtual Router Redundancy Protocol (VRRP) group which has a corresponding active VR associated with a remote router;
    one or more passive VR(s) which is/are part of a passive VRRP group which has one or more corresponding passive VR(s) associated with the remote router; and
    said active VR and said corresponding active VR implement VRRP while said passive VR(s) and said corresponding passive VR(s) do not implement VRRP but instead the passive VR(s) mimic a master/backup state associated with the active VR and the corresponding passive VR(s) mimic a master/backup state associated with the corresponding active VR.
2. The router of claim 1, wherein each of the passive VRs has a distinctive Internet Protocol (IP) address and each of the passive VRs has the same Media Access Control (MAC) address as was assigned to said active VRRP group.

3. The router of claim 1, wherein said active VR is not able to be removed if any of the passive VR(s) are still being utilized.

4. The router of claim 1, wherein there are upto 255 active VRRP groups per Ethernet VLAN.

5. The router of claim 1, wherein said active VRRP group can be either a multi-second active VRRP or a sub-second active VRRP group.

6. A method for implementing Virtual Router Redundancy Protocol (VRRP) within a router, said method comprising the steps of:

configuring an active Virtual Router (VR) which is part of an active VRRP group which has a corresponding active VR associated with a remote router;

configuring one or more passive VR(s) which is/are part of a passive VRRP group which has one or more corresponding passive VR(s) associated with the remote router; and wherein said passive VR(s) do not implement VRRP with their corresponding passive VR(s) which are associated with the remote router but instead the passive VR(s) mimic a master/backup state associated with the active VR which does implement the VRRP with the corresponding active VR that is associated with the remote router.

7. The method of claim 6, wherein each of the passive VRs has a distinctive Internet Protocol (IP) address and each of the passive VRs has the same Media Access Control (MAC) address as was assigned to said active VRRP group.

8. The method of claim 6, wherein said active VR is not able to be removed if any of the passive VR(s) are still being utilized.

9. The method of claim 6, wherein there are upto 255 active VRRP groups per Ethernet VLAN.

10. The method of claim 6, wherein said active VRRP group can be either a multi-second active VRRP or a sub-second active VRRP group.

11. A network comprising:

a first router;

a second router;

said first router includes an active Virtual Router (VR) and said second router includes a corresponding active VR, wherein said active VR and said corresponding active VR form an active Virtual Router Redundancy Protocol (VRRP) group; and said first router includes a plurality of passive VRs and said second router includes a corresponding plurality of passive VRs, wherein said passive VRs and said corresponding passive VRs form a passive VRRP group, and wherein said active VR and said corresponding active VR implement VRRP while said passive VR(s) and said corresponding passive VR(s) do not implement VRRP but instead the passive VR(s) mimic a master/backup state associated with the active VR and the corresponding passive VR(s) mimic a master/backup state associated with the corresponding active VR.

12. The network of claim 11, wherein each of the passive VRs has a distinctive Internet Protocol (IP) address and each of the passive VRIs has the same Media Access Control (MAC) address as was assigned to said active VRRP group.

13. The network of claim 11, wherein said active VR is not able to be removed if any of the passive VRI(s) are still being utilized.

14. The network of claim 11, wherein there are upto 255 active VRRP groups per Ethernet VLAN.

15. The network of claim 11, wherein said active VRRP group can be either a multi-second active VRRP or a sub-second active VRRP group.

* * * * *

UNITED STATES PATENT AND TRADEMARK OFFICE
CERTIFICATE OF CORRECTION

PATENT NO. : 7,573,812 B2  
APPLICATION NO. : 11/614354  
DATED : August 11, 2009  
INVENTOR(S) : Sanjay et al.

Page 1 of 1

It is certified that error appears in the above-identified patent and that said Letters Patent is hereby corrected as shown below:

On the Title Page, item (54), in Title, in Column 1, Line 2, delete "PROTOTCOL" and insert -- PROTOCOL --, therefor.

In Column 1, Line 2, delete "PROTOTCOL" and insert -- PROTOCOL --, therefor.

In Column 2, Line 16, delete "IP(VL)" and insert -- IP(V1) --, therefor.

In Column 8, Line 7, in Claim 11, delete "anactive" and insert -- an active --, therefor.

Signed and Sealed this

Twenty-fourth Day of November, 2009

David J. Kappos  
*Director of the United States Patent and Trademark Office*